US012587056B2

(12) United States Patent　　　　(10) Patent No.:　US 12,587,056 B2

Feustel et al.　　　　　　　　　　　(45) Date of Patent:　　Mar. 24, 2026

(54) MULTIPART ROTOR FOR AN ELECTRIC MACHINE, ELECTRIC MACHINE, AND MOTOR VEHICLE

(71) Applicant: Bayerische Motoren Werke Aktiengesellschaft, Munich (DE)

(72) Inventors: Silko Feustel, Munich (DE); Jerome Ragot, Munich (DE); Yann Tremaudant, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 231 days.

(21) Appl. No.: 18/286,146

(22) PCT Filed: May 17, 2022

(86) PCT No.: PCT/EP2022/063261

§ 371 (c)(1),
(2) Date: Oct. 9, 2023

(87) PCT Pub. No.: WO2022/263083

PCT Pub. Date: Dec. 22, 2022

(65) Prior Publication Data

US 2024/0204604 A1　　Jun. 20, 2024

(30) Foreign Application Priority Data

Jun. 17, 2021　(DE) ..................... 10 2021 115 642.4

(51) Int. Cl.
　H02K 3/52　　　　(2006.01)
　H02K 1/24　　　　(2006.01)
(52) U.S. Cl.
　CPC ............... H02K 3/527 (2013.01); H02K 1/24 (2013.01)

(58) Field of Classification Search
　CPC ...... H02K 3/527; H02K 1/24; H02K 2201/15; H02K 1/276

(Continued)

(56) References Cited

U.S. PATENT DOCUMENTS 10,523,079 B2　　12/2019　Huang et al.
2005/0253476 A1*　11/2005　Zhong ...................... H02K 1/08
　　　　　　　　　　　　　　　　　　310/216.064

(Continued)

FOREIGN PATENT DOCUMENTS

DE　　10 2018 213 567 B3　　12/2019
JP　　　　57-42541 U　　　3/1982

(Continued)

OTHER PUBLICATIONS

WO2011012132A2 English translation (Year: 2025).*

(Continued)

*Primary Examiner* — Christopher M Koehler
*Assistant Examiner* — Viswanathan Subramanian
(74) *Attorney, Agent, or Firm* — Crowell & Moring LLP

(57)　　　　　　ABSTRACT

A rotor includes a magnetic field-generating component for producing a rotor magnetic field and a rotor core for holding the component. The rotor core has an annular rotor yoke and at least two rotor poles which are arranged on the rotor yoke and are configured in multiple parts, and each of which has a rotor tooth integrally formed on the rotor yoke and a pole shoe that is separate from the rotor tooth for arranging the component on the corresponding rotor tooth. The pole shoes are pressed radially against the respective rotor tooth, and the rotor has auxiliary joining parts, each of which is configured to fix at least one pole shoe to the corresponding rotor tooth by a force-fitting connection and which are at (Continued)

least partly arranged in respective pole gaps between two rotor poles and are secured to the rotor yoke by at least one connection element.

11 Claims, 3 Drawing Sheets

(58) Field of Classification Search
USPC .......................... 310/156.48, 156.33, 156.56
See application file for complete search history.

(56) References Cited

U.S. PATENT DOCUMENTS

| | | | |
|---|---|---|---|
| 2007/0278888 A1 | 12/2007 | Adolf et al. | |
| 2021/0006105 A1 | 1/2021 | Feustel et al. | |

FOREIGN PATENT DOCUMENTS

| | | | | |
|---|---|---|---|---|
| WO | WO-2011012132 A2 * | 2/2011 | ........... | H02K 1/2766 |
| WO | WO-2011120890 A1 * | 10/2011 | ............. | H02K 1/276 |

OTHER PUBLICATIONS

WO2011120890A1 English translation (Year: 2025).*
International Search Report (PCT/ISA/210) issued in PCT Application No. PCT/EP2022/063261 dated Sep. 27, 2022 with English translation (4 pages)
German-language Written Opinion (PCT/ISA/237) issued in PCT Application No. PCT/EP2022/063261 dated Sep. 27, 2022 with English translation (9 pages)

* cited by examiner

MULTIPART ROTOR FOR AN ELECTRIC MACHINE, ELECTRIC MACHINE, AND MOTOR VEHICLE

BACKGROUND AND SUMMARY OF THE INVENTION

The invention relates to a rotor for an electric machine of an electrically drivable motor vehicle. The rotor has a magnetic field-generating component for configuring a rotor magnetic field, and a rotor core for holding the magnetic field-generating component. The rotor core comprises an annular rotor yoke and at least two rotor poles which are disposed on the rotor yoke, are configured in multiple parts and to this end have in each case one rotor tooth configured integrally with the rotor yoke, and a pole shoe which is separate therefrom for disposing the magnetic field-generating component on the associated rotor tooth. The invention moreover relates to an electric machine and to a motor vehicle.

In the present case, the focus is on electric machines for electrically drivable motor vehicles, for example electric vehicles or hybrid vehicles. The electric machines have a stationary stator with stator windings that can be energized, and a rotor which is mounted so as to be rotatable relative to the stator and has a magnetic field-generating component. In the case of a separately excited or current-excited electric machine, the magnetic field-generating component has rotor windings or rotor coils that are able to be energized, respectively. The rotor has a rotor core which supports the rotor windings. The rotor core is usually an integral iron core which consists of an annular rotor yoke and a plurality of rotor poles which are disposed along a rotor circumference on the rotor yoke. The rotor poles usually consist of a rotor tooth, or rotor shaft, respectively, that projects radially from the rotor yoke, and of a circular-segmented pole shoe that protrudes tangentially on the rotor tooth. The pole shoes here form a substantially cylindrical rotor circumference of the rotor core. Pole gaps in which the rotor windings are incorporated are formed between the rotor teeth.

In order for the rotor windings to be incorporated in the pole gaps, the pole shoes of two neighboring rotor poles are disposed so as to be mutually spaced apart such that the pole shoes expose an access opening to the pole gaps on the rotor circumference. In order for the rotor windings to be disposed on the rotor teeth, a wire-shaped winding conductor is incorporated in the pole gaps using a tool by way of the access openings. The rotor teeth are then wrapped with the winding wire, whereby a high fill factor is to be achieved. As a result of the tangentially projecting pole shoes, the access openings into the pole gaps are smaller than a pole gap diameter, so that it is very difficult for the pole gaps to the filled with the winding wire. This often results in a sub-optimal winding quality and thus in a sub-optimal fill factor.

To this end, DE 10 2018 213 567 A1 discloses a rotor for a separately excited internal-rotor synchronous machine in which the rotor poles are configured in multiple parts. The rotor poles have in each case one rotor tooth and two separate pole shoe elements, wherein the rotor teeth are configured integrally with the rotor yoke, and the pole shoe elements are able to be mechanically connected to the rotor teeth after the rotor windings have been disposed on the rotor teeth. Two pole shoe elements are disposed on two sides of the rotor tooth that lie opposite one another in the tangential direction, and are connected to the rotor tooth in a form-fitting manner, for example by way of a dovetail connection. Such a rotor is complex in terms of production.

It is an object of the present invention to provide a rotor which is easy to produce and has a multipart rotor core for an electric machine of a motor vehicle.

This object is achieved by a rotor, an electric machine, and a motor vehicle having the features according to the claimed invention.

A rotor according to embodiments of the invention for an electric machine of an electrically drivable motor vehicle has a magnetic field-generating component for configuring a rotor magnetic field, and a rotor core for holding the magnetic field-generating component. The rotor core comprises an annular rotor yoke and at least two rotor poles which are disposed on the rotor yoke, are configured in multiple parts and to this end have in each case one rotor tooth which is configured integrally with the rotor yoke, and a pole shoe which is separate therefrom for disposing the magnetic field-generating component on the associated rotor tooth. The pole shoes are pressed radially against the respective rotor tooth, and the rotor to this end has auxiliary joining parts which are in each case at least partially disposed in the respective pole gaps between two rotor poles, and which are in each case fastened to the rotor yoke by way of at least one connecting element. Moreover, the auxiliary joining parts are conceived to fix in each case at least one pole shoe to the associated rotor tooth by way of a force fit.

The invention moreover relates to an electric machine for a motor vehicle. The electric machine can be, for example, a synchronous machine and has a stator and a rotor which is mounted so as to be rotatable relative to the stator. The electric machine can be an internal-rotor or an external-rotor machine. In the case of an internal-rotor machine, the rotor is disposed within the cylindrical stator and is conceived to rotate about a rotation axis within the stator. The rotor has the rotor core and the magnetic field-generating component. The magnetic field-generating component can have rotor coils, for example. The rotor core can be mechanically connected to a driveshaft of the motor vehicle so as to transmit torque. The rotor core is preferably formed in a solid-material construction mode, for example from iron. In the axial direction along the rotation axis, the rotor core is thus composed in particular of a solid material and not of axially stacked lamination sheets. The rotor core is configured in multiple parts, wherein the rotor poles herein are configured in multiple parts. The rotor poles have in each case the rotor tooth, or the rotor shaft, respectively, and the pole shoe which is separate from the latter. The rotor teeth and the pole shoes are mechanically connected during the production of the rotor.

The rotor teeth of the rotor poles are configured so as to be monolithic with the ring-shaped, for example annular, rotor yoke. The rotor teeth are disposed so as to be mutually spaced apart along the rotor circumference, while configuring the pole gaps or rotor grooves, and project radially outward, for example. The rotor yoke and the rotor teeth in this way form an annular gear wheel with external toothing, whereby the rotor teeth have in particular a substantially rectangular cross section. The rotor yoke and the rotor teeth are configured without pole shoes. As a result of the absence of the pole shoes the pole gaps are completely open. By virtue of the open pole gaps, a pre-wound rotor coil, or a prefabricated rotor winding of the magnetic field-generating component, respectively, can be pushed onto, or placed on, the rotor teeth in a particularly simple way, for example.

After the magnetic field-generating component has been disposed on the rotor teeth, the pole shoes are fastened to the rotor teeth. The pole shoes are conceived inter alia, to prevent the magnetic field-generating component being released from the rotor poles by virtue of the radially outwardly acting centrifugal force during the rotation of the rotor. The pole shoes here are configured in the manner of caps and are placed on the rotor teeth. The pole shoes preferably have a circular-segmented cross section which is delimited by a chord and an arc. Sides or external faces of the pole shoes that are assigned to the chords are disposed on sides or external faces of the rotor teeth that lie radially opposite the rotor yoke, respectively. Sides of the pole shoes that are assigned to the chords form a circumference, in particular an external circumference of the rotor. In the joined state of the rotor and the stator, this external circumference faces an air gap between the rotor and the stator. The pole shoes herein protrude laterally from the rotor tooth in regions so that the rotor poles are configured so as to be substantially mushroom-shaped. These laterally protruding pole shoe regions lie opposite one another in the circumferential direction.

In the process, in particular no form-fitting connection in the radial and the tangential direction between corresponding joining partners of the pole shoes is formed, as would be the case in a dovetail connection, for example. Rather, the mechanical connection between a pole shoe and the associated rotor tooth is, in particular exclusively, a force-fitting one in that the pole shoe is pressed against the rotor tooth by way of a normal force directed radially in the direction of the rotor yoke. The auxiliary joining parts which are at least partially disposed in the pole gaps are provided for pressing or pushing the pole shoes against the rotor teeth. The auxiliary joining parts herein exert the normal force acting on the pole shoes and are in each case fastened to the rotor yoke by way of at least one connecting element. The connecting elements are in particular screws, rivets or bolts.

As a result of the rotor core being configured in multiple parts, the latter can be particularly easily equipped with the magnetic field-generating component during the production of the rotor. As a result of the pole shoes being merely placed against the rotor teeth and fastened to the rotor teeth by way of the auxiliary joining parts, the production of the rotor is designed to be particularly simple.

In a refinement of the invention, the rotor for each pole gap has a plurality of auxiliary joining parts which are disposed so as to be distributed across an axial length of the rotor. In this way, the pole gaps are not completely closed by the auxiliary parts across the axial length of the rotor. However, the auxiliary parts of one pole gap can be mechanically connected to one another, for example by way of a rail, so that assembling of the auxiliary joining parts on the rotor core is facilitated.

It can be provided that each pole shoe is connected in a form-fitting manner to at least one auxiliary joining part. For example, each pole shoe can have a receptacle region, for example a groove, in which the associated auxiliary joining part can engage. As a result of this form-fitting connection, the assembly of the rotor can be facilitated, and the stability of the rotor can be increased.

It has proven to be advantageous for each pole shoe to be connected in a force-fitting manner to the associated rotor tooth by way of at least two auxiliary joining parts which are disposed in the two adjacent pole gaps, wherein each auxiliary joining part connects the pole shoes of two neighboring rotor poles in a force-fitting manner to the respective rotor tooth. In this way, each auxiliary joining part presses two neighboring pole shoes against their respective rotor tooth, and acts in particular on that region of the respective pole shoe that is adjacent to the pole gap and laterally protrudes on the rotor tooth. In order to be able to reliably fix each pole shoe, each pole shoe is compressed by at least two auxiliary joining parts which act on the regions of the pole shoe that lie laterally opposite one another and protrude on the rotor tooth.

The auxiliary joining parts are preferably configured in the manner of V-clamps and have in each case two legs which are connected by an apex region, wherein leg ends of the legs are disposed on two neighboring pole shoes. The apex region is disposed on the rotor yoke and has at least one through-opening for at least one connecting element. The legs in the pole gap here, proceeding from the rotor yoke, extend in the direction of the pole shoes and act in particular on the pole shoe regions of the pole shoes that laterally protrude on the rotor tooth. To this end, the annular rotor yoke can have planar regions without bends, the apex regions being disposed so as to rest on the latter.

The pole shoes on two laterally opposite sides particularly preferably have in each case one rebate, and the leg ends are configured as laterally angled leg portions which engage in the respective rebate. For example, one rebate can in each case be configured in the side of the protruding pole shoe region that is assigned to the arc. The respective leg end can engage in this rebate. A form-fitting connection between the pole shoe and the auxiliary joining part can be established by the rebate and the leg portion at least along the circumferential direction.

In one embodiment of the invention, the magnetic field-generating component has a rotor winding with pre-wound winding conductors which are pushed onto the rotor teeth. The electric machine is thus configured as a separately excited machine, for example a current-excited synchronous machine, and has the rotor winding that is able to be energized for generating the rotor magnetic field. The winding conductors here are pre-wound and can be easily pushed onto the exposed rotor teeth without pole shoes during the production of the rotors. The winding conductors of the rotor windings are in particular configured to be tape-shaped. In such a tape-shaped winding or tape coil, the winding conductors can be configured as aluminum or copper tapes which are embedded in an insulation film. Such tapes can be wound in a simple way and provide a high fill factor.

In a refinement of the invention, the magnetic field-generating component has permanent magnets which are disposed on the rotor teeth. If the magnetic field-generating component has permanent magnets and rotor windings, the electric machine is configured as a hybrid-excited machine. Such an electric machine combines the advantages of the current-excited synchronous machine and of the permanently excited synchronous machine, because the rotor magnetic field is generated by a combination of electromagnets and permanent magnets. The efficiency in specific load regions and the maximum permanent torque of the electric machine can be increased in this way. In particular, the rotor teeth on a side that faces the pole shoes have in each case at least one depression in which is disposed in each case at least one permanent magnet, and which, while configuring a respective receptacle space for the permanent magnets, is closed by the respective pole shoe. In order for the rotor to be produced, the permanent magnets are thus placed in the depressions, the latter being exposed on account of the absence of the pole shoes. Moreover, the pre-wound rotor coils are optionally pushed onto the rotor teeth. The pole shoes are then placed on the rotor teeth and connected to the latter in a force-fitting manner. As a result, the depressions and the pole gaps are closed so that the permanent magnets, and optionally the rotor coils, can no longer be released from the rotor teeth.

A motor vehicle according to embodiments of the invention comprises an electric machine according to embodiments of the invention. The motor vehicle is in particular configured as an electric vehicle or a hybrid vehicle and has the electric machine as the drive machine.

The embodiments and the advantages of the latter which have been presented in the context of the rotor according to embodiments of the invention apply in analogous manner to the electric machine according to embodiments of the invention and to the motor vehicle according to embodiments of the invention.

Further features of the invention are derived from the claims, from the figures and from the description of the figures. The features and combinations of features mentioned in the description above, and the features and combinations of features mentioned individually hereunder in the description of the figures and/or shown individually in the figures can be used not only in the respective combination set forth but also in other combinations or else on their own.

The invention will now be explained in more detail by way of a preferred exemplary embodiment and with reference to the drawings.

DETAILED DESCRIPTION OF THE DRAWINGS

Identical and functionally equivalent elements are provided with the same reference signs in the figures.

Figure 1A:
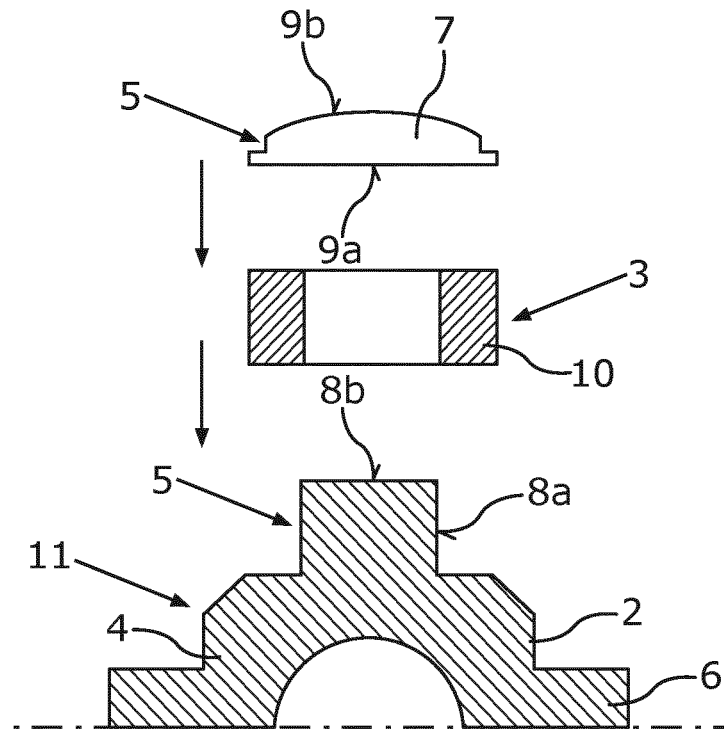
FIGS. 1a to 1c show a schematic illustration of a first embodiment of a rotor according to the invention during the production of the rotor.
Figure 1B:
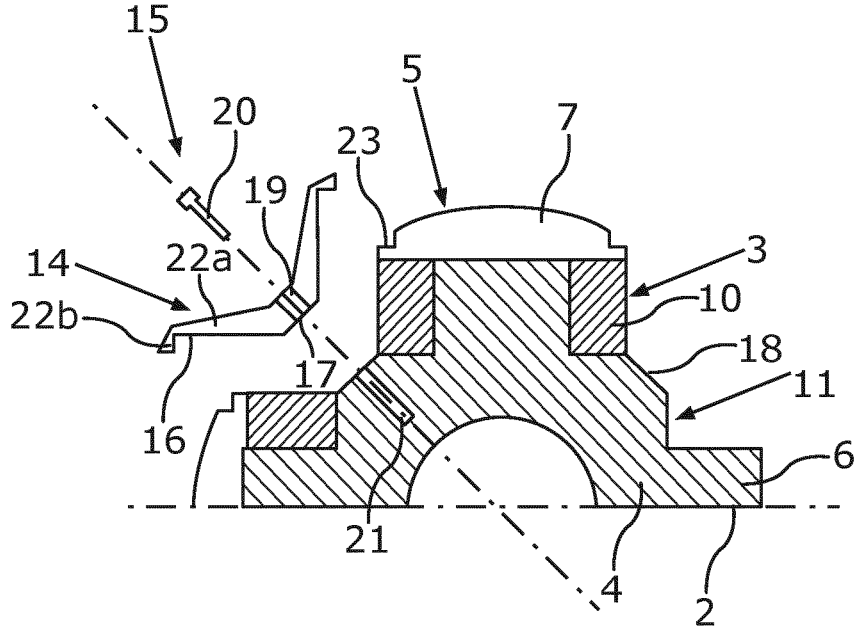
Figure 1C:
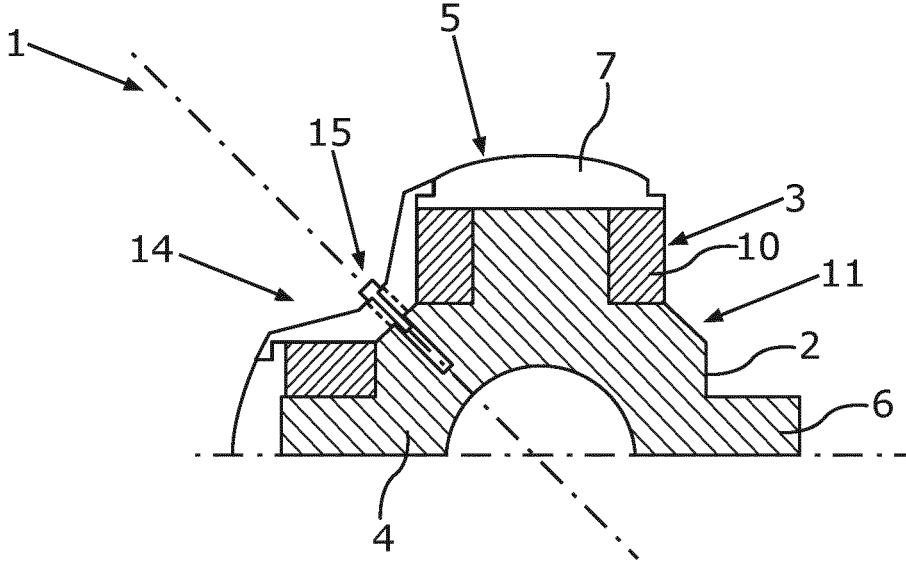
Figure 2A:
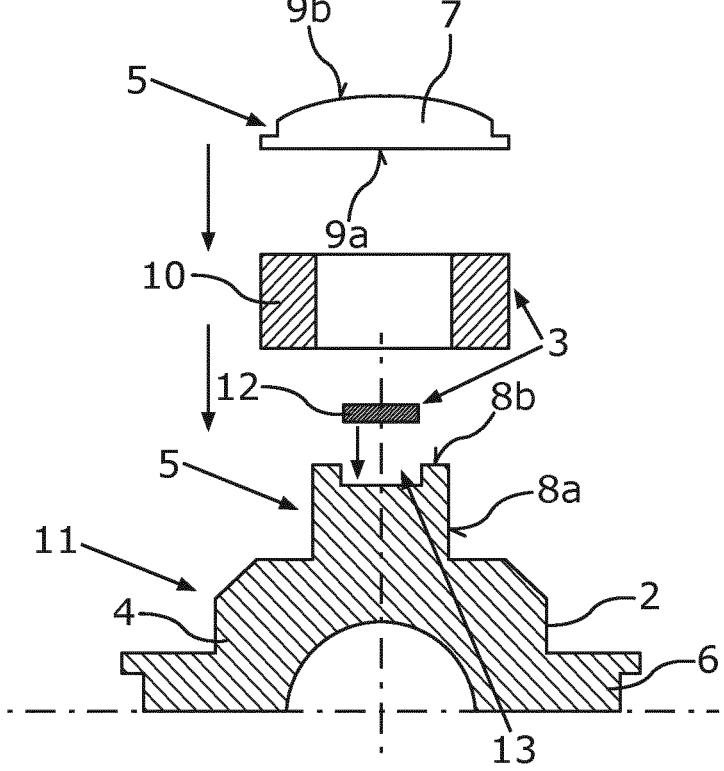
FIGS. 2a to 2c show a schematic illustration of a second embodiment of a rotor according to the invention during the production of the rotor.
Figure 2B:
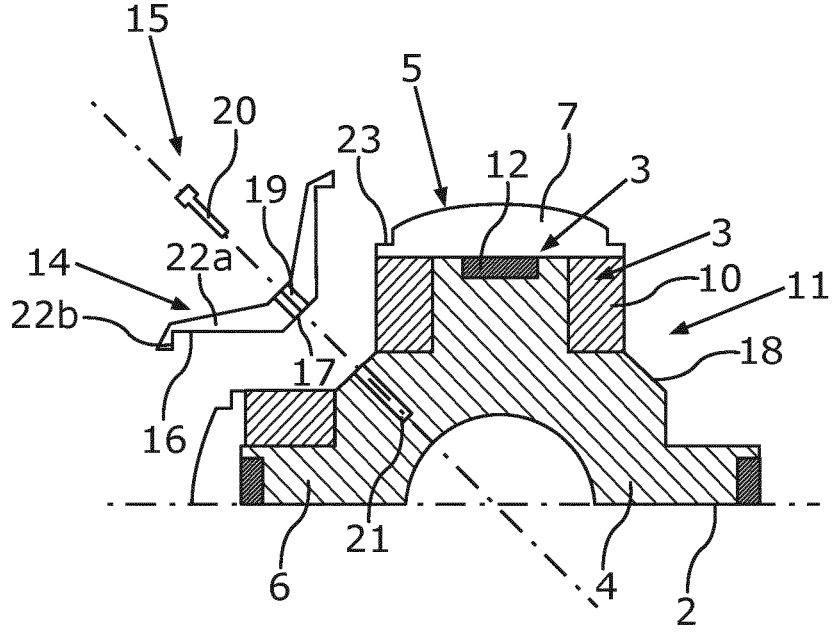
Figure 2C:
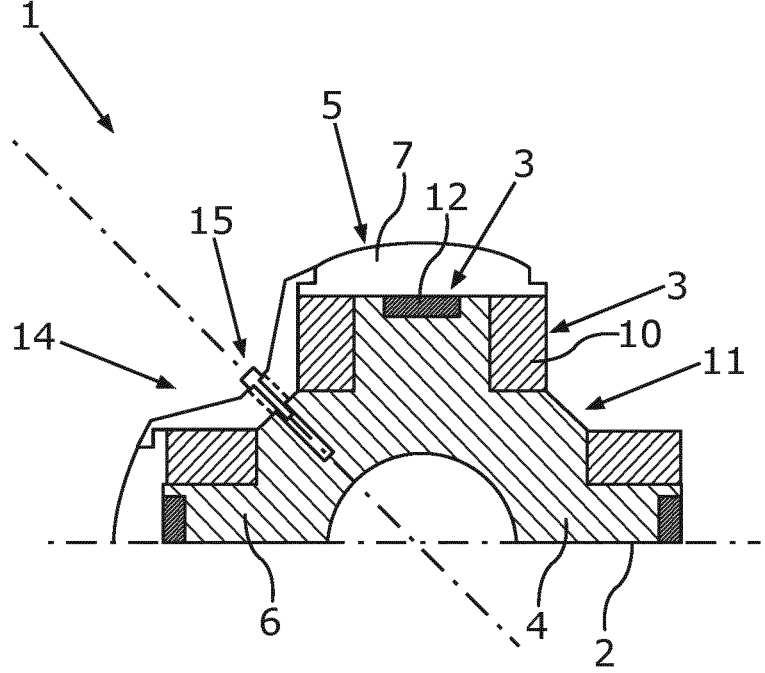

FIG. 1c and FIG. 2c show two different embodiments of a fragment of a rotor 1 for an electric machine of a motor vehicle not shown here. FIGS. 1a, 1b and FIGS. 2a, 2b show manufacturing steps of the associated rotor 1. The electric machine is configured in particular as a drive machine of the motor vehicle and as a synchronous machine. The rotor 1 has a rotor core 2 which is configured for holding a magnetic field-generating component 3 and for conducting a rotor magnetic field generated by the magnetic field-generating component 3. The rotor core 2 is configured, for example, from solid steel and has a rotor yoke 4 and a plurality of rotor poles 5 which are configured in two parts. Each rotor pole 5 has one rotor tooth 6 which is configured integrally with the rotor yoke 4.

Moreover, each rotor pole 5 has a pole shoe 7 which is configured separately from the respective rotor tooth 6 and can be mechanically connected to the respective rotor tooth 6 and be released again from the respective rotor tooth 6 in a non-destructive manner. The rotor teeth 6 here have a rectangular cross section, and have two parallel, laterally opposite lateral flanks 8a, and an external side 8b that faces the pole shoe 7. The pole shoes 7 have a circular-segmented cross section and in this way have a first side 9a, which is delimited by a chord, and a second side 9b, which is delimited by an arc.

Owing to the fact that the pole shoes 7 are releasable from the rotor teeth 6 in a non-destructive manner, the rotor 1 can be manufactured in a simple way, as is shown in FIG. 1a, FIG. 1b and FIG. 2a, FIG. 2b. Initially, the pole shoes 7 are released from the rotor teeth 6, as is shown FIG. 1a and FIG.

2a. In this way, the magnetic field-generating component 3 can be disposed on the rotor teeth 6 in a simple way. The magnetic field-generating component 3 has a rotor winding 10 is which has pre-wound winding conductors. These pre-wound winding conductors can be pushed onto the rotor teeth 6 and in this way disposed in the pole gaps 11 neighboring the rotor poles 5. The magnetic field-generating component 3 of the rotor 1 according to FIG. 1c has only rotor windings 10 so that the electric machine comprising the rotor 1 is configured as a separately excited, or current-excited, electric machine. The magnetic field-generating component 3 of the rotor 1 according to FIG. 2c moreover has permanent magnets 12 so that the electric machine comprising the rotor 1 is configured as a hybrid-excited electric machine. In order for the permanent magnets 12 to be disposed on the rotor teeth 6, the external sides 8b of the rotor teeth 6 have in each case one depression 13 into which a respective permanent magnet 12 can be disposed with an exact fit.

After the magnetic field-generating component 3 has been disposed on the rotor teeth 6, the pole shoes 7 are placed on the rotor teeth 6. According to FIG. 1b, FIG. 1c, the pole shoe 7 here, by way of the first side 9a, rests on the full area on the external side 8b of the rotor tooth 6. According to FIG. 2b, FIG. 2c, the pole shoe 7 by way of the first side 9a rests on the external side 8b of the rotor tooth 6 and on the permanent magnet 12, and in the process closes the depression 13 such that the permanent magnet 12 is surrounded, or enclosed, by the pole shoe 7 and the rotor tooth 6 and is embedded, or buried, in the rotor core 2, respectively.

In order for the pole shoes 7 to now be fixed to the rotor teeth 6, auxiliary joining parts 14 are used. Here, at least one auxiliary joining part 14 is introduced into each pole gap 11, as is shown in FIG. 1b and FIG. 2b, which auxiliary joining part 14 conjointly with further auxiliary joining parts 14 is conceived to fix the pole shoes 7 of the two adjacent rotor poles 5 to the associated rotor tooth 6 in a force-fitting manner. The auxiliary joining parts 14 here are fastened to the rotor yoke 4 by way of in each case one connecting element 15. The auxiliary joining part 14 is configured in the manner of a V-clamp and has two legs 16 and one apex region 17. The apex region 17 here is configured in the shape of a web and rests on the rotor yoke 4, wherein the rotor yoke 4 for this purpose has flattened planar regions 18. The apex region 17 has a through-opening 19 for the connecting element 15, the latter here being configured as a screw 20. The rotor yoke 4 here has a thread 21 for fastening the screw 20 to the rotor yoke 4, which screw 20 is guided through the through-opening 19.

The legs 16 have a first leg portion 22a, which extends parallel to the lateral flanks 8a of the rotor tooth 6, and a second leg portion 22b which is angled laterally, or sideways, away therefrom. The first leg portions 22a here rest on the rotor windings 10 and in this way fix the latter also in the circumferential direction. The second leg portions 22b have been brought to engage with the respective rebates 23 which are configured in the respective second side 9b of the pole shoes 7. The auxiliary joining parts 14 and the pole shoes 7 are connected in a form-fitting manner in this way. The legs 16 pull the pole shoes 7 radially in the direction of the rotor yoke 4 and in this way press the pole shoes 7 against the rotor teeth 6.

The invention claimed is:

1. A rotor for an electric machine of an electrically drivable motor vehicle, the rotor comprising:
   a magnetic field-generating component for configuring a rotor magnetic field; and a rotor core for holding the magnetic field-generating component, wherein:

the rotor core has an annular rotor yoke and at least two rotor poles which are disposed on the rotor yoke, are configured in multiple parts and have in each case one rotor tooth which is configured integrally with the rotor yoke, and a pole shoe which is separate from the rotor tooth for disposing the magnetic field-generating component on the rotor tooth, each pole shoe is pressed radially against a respective rotor tooth, in order to press each pole shoe radially against the respective rotor tooth, the rotor has auxiliary joining parts which are configured to fix each pole shoe to the respective rotor tooth by way of a force fit, the auxiliary joining parts are at least partially disposed in respective pole gaps between two rotor poles, the auxiliary joining parts are fastened to the rotor yoke by at least one connecting element, each pole shoe has a circular-segmented cross section which is delimited by a chord and an arc, and sides of the pole shoes that are assigned to the chords are disposed on sides of the rotor teeth that lie radially opposite the rotor yoke, and the magnetic field-generating component has rotor windings with pre-wound winding conductors which are configured to be pushed onto the rotor teeth.

2. The rotor according to claim 1, wherein:

the at least one connecting element is configured as at least one of a screw, a rivet or a bolt.

3. The rotor according to claim 1, wherein:

each pole shoe is connected in a form-fitting manner to at least one of the auxiliary joining parts.

4. The rotor according to claim 1, wherein:

each pole shoe is connected in a force-fitting manner to the respective rotor tooth by way of at least two of the auxiliary joining parts which are disposed in the two adjacent pole gaps, and each auxiliary joining part connects pole shoes of two neighboring rotor poles in a force-fitting manner to the respective rotor tooth.

5. The rotor according to claim 4, wherein:

the auxiliary joining parts are configured in a manner of V-clamps;

each of the auxiliary joining parts has two legs which are connected by an apex region, leg ends of the legs are disposed on two neighboring pole shoes, and the apex region is disposed on the rotor yoke and has at least one through-opening for the at least one connecting element.

6. The rotor according to claim 5, wherein:

each pole shoe on two laterally opposite sides has one rebate, and the leg ends are configured as laterally angled leg portions which engage in a respective rebate.

7. The rotor according to claim 1, wherein: the winding conductors of the rotor windings are configured to be tape-shaped.

8. The rotor according to claim 1, wherein:

the magnetic field-generating component has permanent magnets which are disposed on the rotor teeth.

9. The rotor according to claim 8, wherein:

each of the rotor teeth on a side that faces the pole shoes has at least one depression in which is disposed at least one permanent magnet, and which, while configuring a respective receptacle space for the at least one permanent magnet, is closed by a respective pole shoe.

10. An electric machine for a motor vehicle, the electric machine comprising:

a stator; and the rotor according to claim 1, wherein the rotor is mounted to be rotatable relative to the stator.

11. A motor vehicle comprising the electric machine according to claim 10.

* * * * *